United States Patent [19]

McNeal

[11] Patent Number: 4,495,690
[45] Date of Patent: Jan. 29, 1985

[54] O-RING PLACEMENT TOOL

[76] Inventor: Lawrence N. McNeal, 2461 Brahms Blvd., Dayton, Ohio 45449

[21] Appl. No.: 525,852

[22] Filed: Aug. 24, 1983

[51] Int. Cl.³ .......................... B23Q 3/00; B25B 1/20
[52] U.S. Cl. ........................................ 29/468; 29/269; 29/271; 29/283; 29/526 R; 269/43; 269/131; 277/1; 277/11
[58] Field of Search ................ 29/468, 526 R, 157 R, 29/269, 271, 283; 277/1, 9.5, 11, 10; 269/43, 131, 238, 130, 132

[56] References Cited

U.S. PATENT DOCUMENTS

| | | | |
|---|---|---|---|
| 923,357 | 6/1909 | Jackson | 269/131 X |
| 2,127,578 | 8/1938 | Wyman | 277/11 |
| 2,249,783 | 7/1941 | Reggio | 29/283 UX |
| 2,319,113 | 5/1943 | Christman | 29/468 UX |
| 2,455,517 | 12/1948 | Nielson | 269/130 |
| 2,603,994 | 7/1952 | Norton | 269/238 X |
| 3,292,922 | 12/1966 | Naster | 269/31 |
| 3,620,554 | 11/1971 | Ward et al. | 29/526 R X |
| 3,730,537 | 5/1973 | Ward et al. | 227/10 X |
| 3,909,011 | 9/1975 | Sheesley | 227/11 |
| 4,436,310 | 3/1984 | Sawabe et al. | |

Primary Examiner—Charlie T. Moon
Attorney, Agent, or Firm—Biebel, French & Nauman

[57] ABSTRACT

A tool is provided for seating "O" rings in flanged pipe. An "O" ring positioning plate is held between two parallel facing plates. A flexible "O" ring support band is mounted in the tool and holds the "O" ring tightly against an arcuate cut in the lower surface of the "O" ring positioning plate. A support member is included to support the tool on the pipe's flange.

4 Claims, 6 Drawing Figures

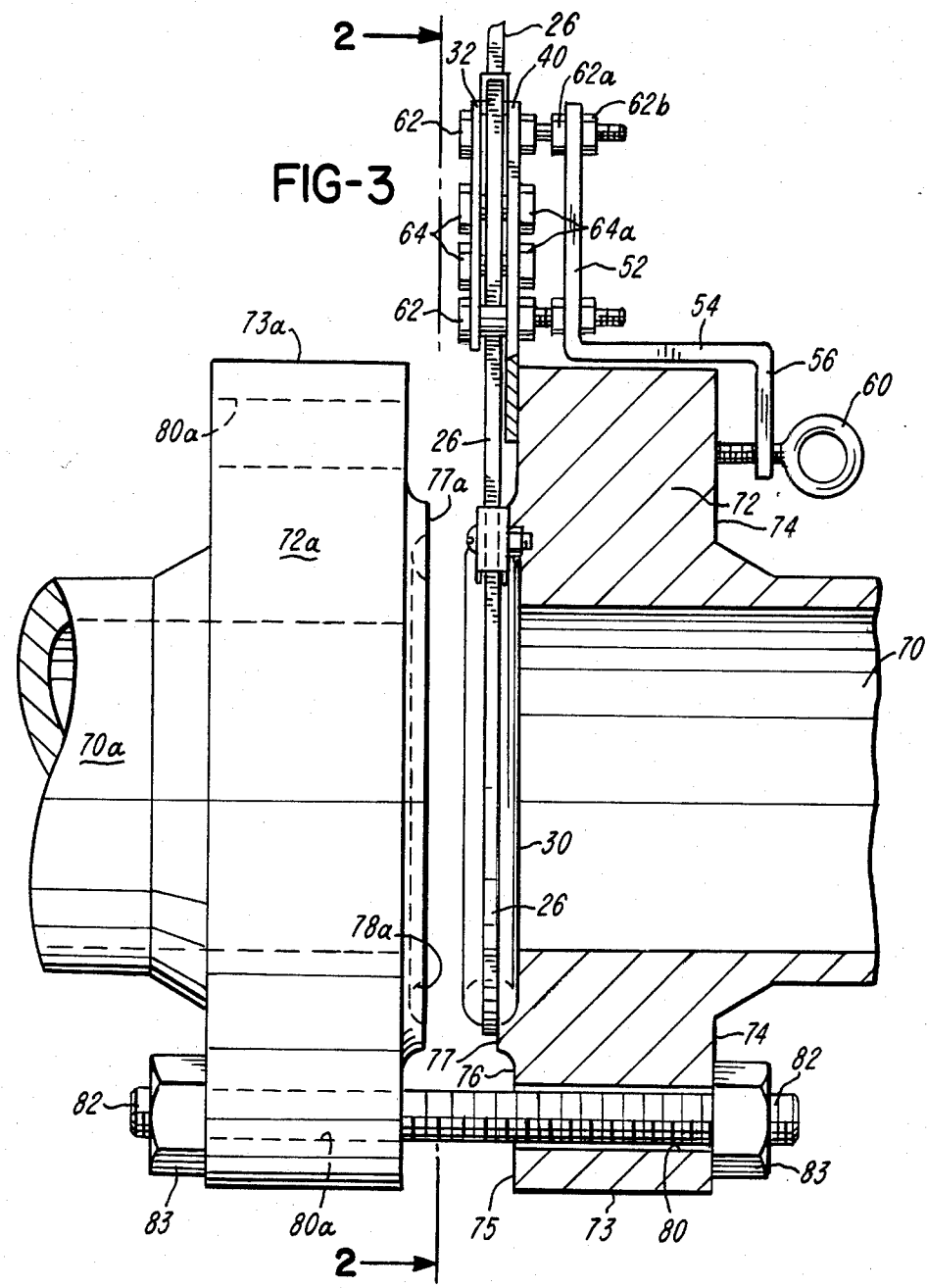

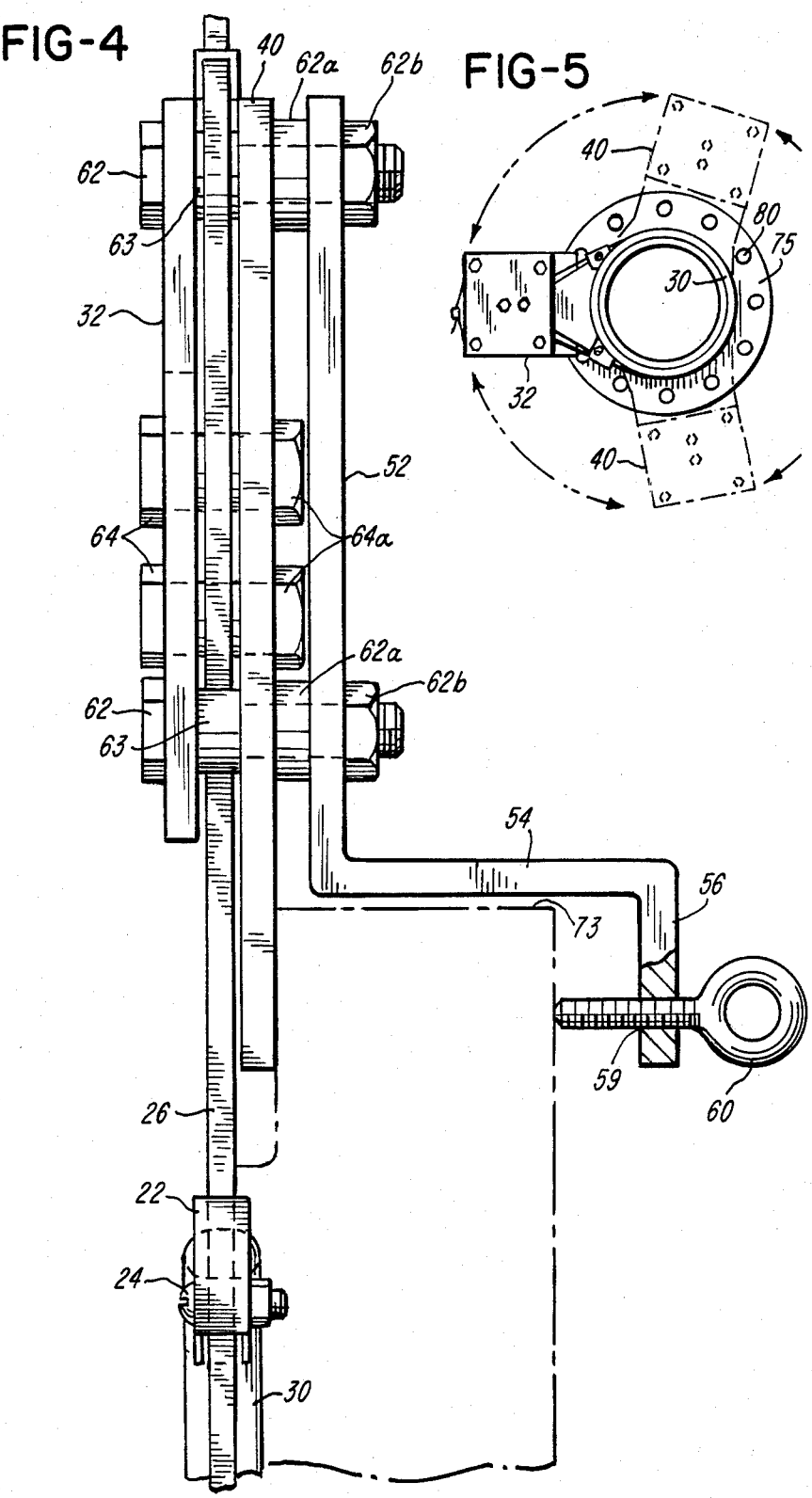

4,495,690

O-RING PLACEMENT TOOL

CROSS REFERENCE TO RELATED APPLICATION

This application is directed to an improvement in the "O" Ring placement tool disclosed and claimed in application Ser. No. 06/525,851 filed of even date herewith as the joint application of Lawrence N. McNeal and Robin McNeal.

BACKGROUND OF THE INVENTION

Large diameter pipe of the type employed to transport gases and liquids under pressure typically are made with flanges on each end with "O" ring seats, i.e., hemispherical annular seating grooves, cut into the face of each flange. To seal two pipe sections together to provide a tight leakproof seal, an "O" ring is placed in the seats cut into the complementary faces of the flanges of the two pipe sections to be joined. When the flanges are sealed by bolting the flanges together, the "O" ring is compressed to provide a tight, leakproof seal.

This method of joining flanged pipe sections does not present unusual difficulties where the pipe sections are to be assembled above ground and in good light. Serious difficulties are encountered, however, when the above-described method must be employed to join pipe sections together under water as in laying pipe to deliver oil or gas from off-shore wells to on-shore gathering facilities. As can be readily visualized, visibility in such work locations is poor. Moreover, surface wave action frequently causes the support vessel to surge. The movement of the support ship tends to move one or both of the flanges, which in turn may cause slippage of the "O" ring. The incidence of hand injury suffered by divers assembling pipe lines is high by reason of a tendency of divers to hand hold an "O" ring in the desired position while another pipe section is being moved into proper position to seal the flanged sections of pipe together.

Accordingly, there is a serious need in the art for improved tools and methods for seating an "O" ring in a seat defined by seating grooves cut into complementary sections of flanged pipe.

SUMMARY OF THE INVENTION

A tool is provided for positioning an "O" ring in the "O" ring seating groove cut into the face of a section of flanged pipe or the like. The tool comprises a combination of:

(a) a thin, flat "O" ring positioning plate including;
  (i) an upper section of generally rectangular section having a plurality of holes therein,
  (ii) a lower section which;
    (a) is integral with said upper section,
    (b) has complementary sidewalls which flare outwardly from the sidewalls of the upper plate to define a depending skirt,
    (c) has a complementary pair of guide members attached to the lower sections of the skirt which define channels between the guide members and the walls of the skirt, and
    (d) has an arcuate lower face adapted to snugly fit onto an "O" ring to be seated by said tool,
(b) a pair of flat parallel facing plates to grasp and hold therebetween the upper section of the "O" ring positioning plate,
(c) a length of a flexible "O" ring support band which runs between the parallel facing plates and in cooperation with the lower section of the "O" ring support plate defines a loop to support an "O" ring, and
(d) a support member to hold the facing plates and the "O" ring positioning plate in a fixed plane and to support the tool on a flange.

The assembly of the facing plates and the "O" ring support plate are held in a fixed parallel relationship and attached to the support member by suitable bolts which pass through said plates and the support member.

BRIEF DESCRIPTION OF THE DRAWINGS

FIG. 3 is a side elevation view, partially in section, illustrating the manner in which the tool is used to position the "O" ring in the seat defined by the seating grooves cut into two complementary sections of flanged pipe.

FIG. 4 is an enlarged side elevation view, taken through line 4—4 of FIG. 2, showing on an enlarged scale the tool mounted on the flange of a pipe section.

FIG. 5 is a front plan view illustrating the manner in which the tool can be mounted on a flange of a pipe section in a position other than the top center position illustrated in FIG. 1.

DETAILED DESCRIPTION OF THE INVENTION

Figure 1:
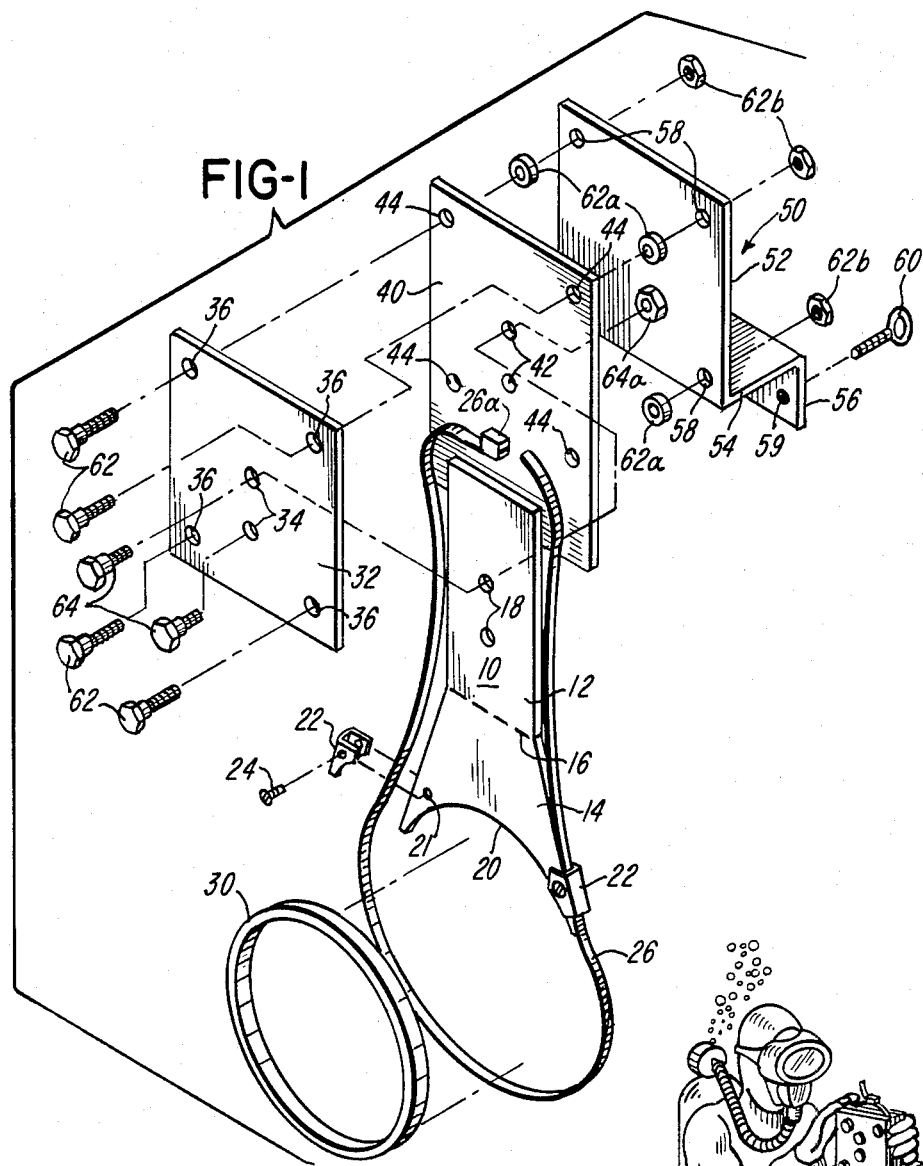
FIG. 1 is an exploded view of the tool of the invention showing the manner in which the components of the tool are assembled.

Referring to FIG. 1, the tool includes a relatively thin "O" ring positioning plate 10 which includes an upper section 12 of generally rectangular cross-section and a lower section 14, the merging of the upper and lower sections being shown by phantom line 16. The thickness of plate 10 is less than the cross-sectional diameter of the annulus of "O" ring 30. The upper section 12 includes two holes 18. The side walls of lower section 14 flare outwardly to define a depending skirt. The bottom of lower section 14 is cut to provide a lower arcuate surface 20 adapted to fit snuggly on the "O" ring to be seated by the tool. A pair of holes 21 are provided in each of the lower sections of the skirt. A pair of guide members 22 are attached to the skirt by means of screws 24 or like fastening members. Channels are provided between the guide members 22 and the outer walls of the depending skirt. An "O" ring support band 26 of a width less that the cross-sectional diameter of said "O" ring passes through the channels defined by the guide members 22 and the side walls of the skirt to form a loop which, when tightened, urges "O" ring 30 against the arcuate surface 20 of the "O" ring positioning plate. Band 26 preferably is fabricated from polytetrafluoroethylene.

"O" ring positioning plate 10 is mounted between and secured to two parallel facing plates 32 and 40. Plate 32 has a pair of holes 34 which are aligned with holes 18 of "O" ring positioning plate 10. Plate 32 also contains four holes 36 in its outer corners, the holes 36 being positioned to lie outside the area of the plate 32 which will be covered by the upper portion 12 of "O" ring positioning plate 10. Plate 40 contains a pair of holes 42 which are aligned with holes 18 of "O" ring positioning plate 10 and holes 34 of plate 32. Plate 40 also contains 4 holes 44 which are aligned with holes 36 of plate 32. The tool also includes a support element designated as 50 and which, in the embodiment shown, consists of a vertical plate 52, a horizontal plate 54 integrally attached thereto, and a lip plate 56 depending perpendicularly from and integrally attached to plate 54. Lip plate 56 contains a plurality of threaded holes 59, only one of which is shown in FIG. 1. A plurality of set bolts 60 are provided for insertion into holes 59, only one of said set bolts being shown in FIG. 1.

The parallel facing plates 32 and 40 and "O" ring support plate 10 are held in fixed parallel relationship by a series of 4 bolts 62 which pass through holes 36 and 44 and a set of 2 bolts 64 which pass through holes 34, 18, and 42. A pair of nuts 64a (best seen in FIG. 4) are attached to the ends of bolts 64. The bolts 62 also pass through holes 58 of vertical plate 50 of support element 50. Lock nuts 62a and 62b hold plate 52 in parallel relationship with plates 32, 10, and 40. The lock nuts 62a also hold plate 52 at the desired distance from plate 40.

Figure 2:
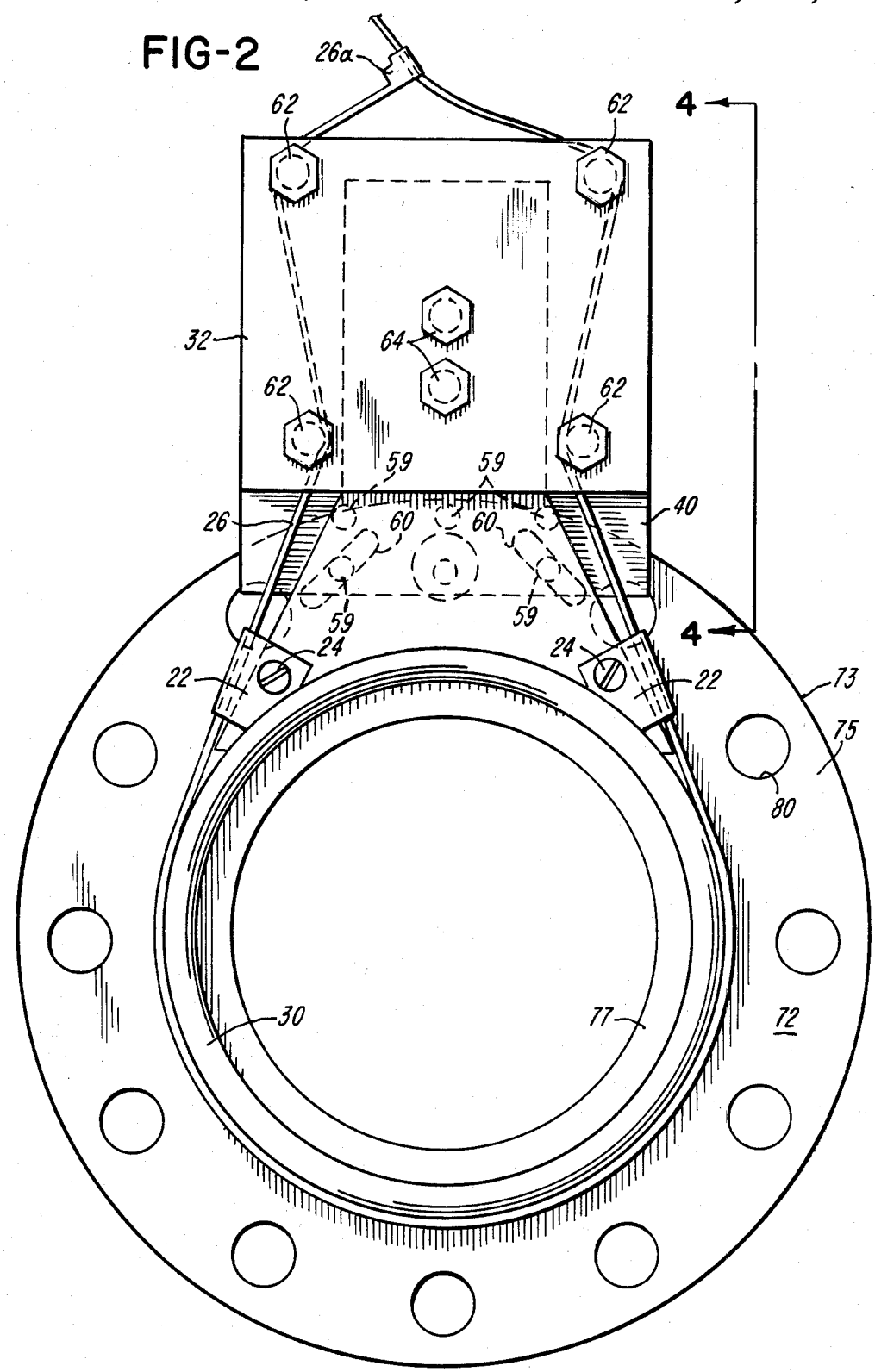
FIG. 2 is a front plan view, taken through line 2—2 of FIG. 3, of the tool of the invention mounted on the flange of a pipe section and holding an "O" ring in the seat cut into the face of said flange.

FIGS. 2, 3, and 4 illustrate the manner in which the tool is mounted on the flange 72 of a section of pipe 70 for seating an "O" ring in the seating groove provided for the "O" ring in the face of the flange. Also shown in FIG. 3 is a complementary pipe section 70a to be joined to pipe section 70 with like parts of the pipe section 70a bearing like members to those of pipe section 70. The flange 72 has an annular face 73, a rear face 74, and a front face 76. The front face 76 has an elevated section 77. The elevated section 77 has a hemispherical annular groove 78 machined therein, which forms a half of the seat for "O" ring 30. The seat 78 is not seen in any of the drawings (it being filled by "O" ring 30), but the complementary seat 78a is shown in the corresponding flanged pipe 70a.

Figure 6:
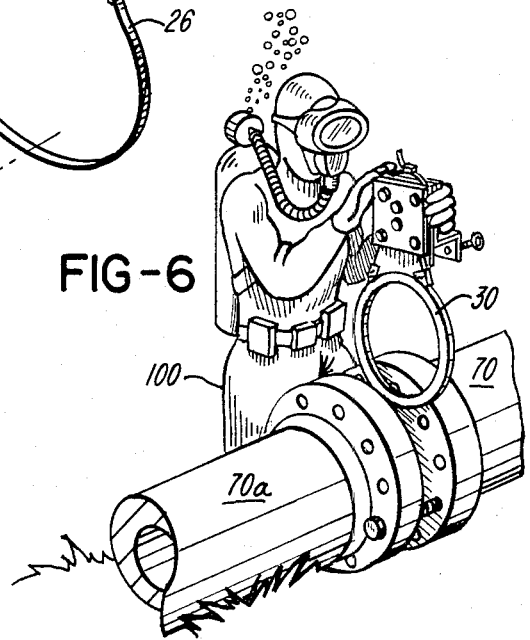
FIG. 6 is a view illustrating the manner in which a diver inserts the tool of the invention between two sections of flanged pipe that have been loosely assembled.

A typical manner for using the "O" ring seating tool to seat an "O" ring in the seat provided by two complementary sections of flanged pipe is to first loosely assemble the two sections of pipe, i.e., 70 and 70a, together by passing bolts 82 through bolt holes 80 and 80a of the two flanges. An "O" ring 30 then is seated in the circular opening defined by arcuate surface 20 of the "O" ring positioning plate 10 and the depending loop of the "O" ring support band 26. The band is tightened to snugly hold the "O" ring by passing the free end of the "O" ring support band 26 through the fastening and locking element 26a provided on its other end. As seen in FIGS. 2 and 4, band 26 rides on the surfaces of spacer elements 63 surrounding bolts 62 in the channels provided between the inner faces of facing plates 32 and 40. The set screws 60 previously will have been backed out of contact with a rear flange face in an earlier operation. The assembled tool, including the "O" ring 30, then is inserted into the gap between the faces of the two flanges. FIG. 6 shows a diver about to insert the tool holding the "O" ring into the gap between the two sections of pipe. The rearward face of the "O" ring positioning plate 10 will be urged against the raised face 77 of flange 72. By slight movement of the tool, the worker can determine (by feel) when "O" ring 30 has been seated in the "O" ring seat 78 (not seen) provided in face 77. At this time, set screws 60 are tightened to rigidly fix the position of the tool.

The complementary pipe section 70a then is moved toward pipe section 70 by further turning of the nuts 83 on bolts 82. When the face 77a of the pipe section 70a virtually touches the face of "O" ring positioning plate 10, "O" ring 30 is completely circumscribed by, and "captured", by the "0" ring seating grooves 78 and 78a provided in the faces 77 and 77a. The "O" ring support band is loosened by withdrawing its free end from the fastening and locking member 26a. The band is then withdrawn from the tool. The set screws 60 are backed out of contact with the face 74 of flange 72. The tool is thus loosened and is removed from between flanges 72 and 72a. Any remaining bolts 82 then are inserted into the openings 80 and 80a in the flanges 72 and 72a, and all of the nuts 83 are torqued to an appropriate degree to provide a leak-proof seal between the pipe sections 70 and 70a.

As best seen in FIG. 4, a small gap of about one-quarter inch is provided between the bottom face of plate 54 and face 73 of flange 72. This gap is provided by reason of the fact that subsea growth, such as barnacles, form on underwater pipe, and are difficult to remove completely. The provision of such a gap minimizes problems of proper aligning the "O" ring with the "O" ring seating grooves.

In FIGS. 2, 3, and 4, the tool is shown mounted on the top dead center position of flange 72, but this is not a requirement. An important design characteristic of the invention is that the tool can be mounted at any position around the flange's perimeter. This flexibility is of major significance in that it permits the divers to work in the most comfortable and safest position, usually where the widest gap is provided between the two flanges.

FIG. 5 is a fragmentary front plan view of the assembly shown in FIG. 2, with certain of the parts removed in certain of the views. The dotted arrows illustrate the manner in which the tool can be rotated about the flange's perimeter.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A tool for positioning an "O" ring in the "O" ring seating groove cut into the face of a section of flanged pipe or the like comprising in combination:
   (a) a thin, flat "O" ring positioning plate, the thickness of said plate being less than the cross-sectional diameter of the annulus of the "O" ring to be positioned by said tool, said plate having;
      (i) an upper section of generally rectangular cross-section which has a plurality of holes therein,
      (ii) a lower section which;
         (a) is integral with said upper section,
         (b) has complementary side walls which flare outwardly from the side walls of the upper plate to define a depending skirt,
         (c) has a complementary pair of guide members attached to lower sections of the skirt of (a) (ii) (b) above and which define channels between said guide members and the walls of said skirt, and (d) has an arcuate lower face adapted to snuggly fit onto an "O" ring to be seated by said tool,
(b) a pair of flat parallel facing plates to grasp and hold therebetween the upper section of said "O" ring positioning plate, said facing plates being wider than the upper section of the "O" ring positioning plate, each of said facing plates having;
  (i) a plurality of holes aligned with the holes provided in the upper section of the "O" positioning plate, and
  (ii) an additional plurality of aligned holes positioned in the outer sections of said facing plates and beyond the area to be covered by the "O" ring support plate,
(c) a plurality of bolts or like fastening means passing through the holes in said facing plates and said "O" ring positioning plate to hold said plates in fixed parallel relationship,
(d) a length of a flexible "O" ring support band having fastening means on its ends so that the length of the band in the tool can be varied, said band being of a width less than the cross-sectional diameter of said "O" ring and adapted to;
  (i) pass through the channels defined by the outer walls of the "O" ring positioning plate, the parallel facing plates and at least one of the bolts of (b) (ii) above,
  (ii) pass through the channels defined by the guide members of (a) (ii) (c),
  (iii) define a generally circular loop depending from the lower section of the "O" ring positioning plate, and
(e) a support member to hold said facing plates and said "O" ring positioning plate in a fixed plane and to support the tool on a flange.

2. A tool of claim 1 in which the support member includes:
(a) a vertical plate having holes aligned with the holes in the facing plates,
(b) a horizontal plate perpendicularly aligned to and integrally attached to said vertical plate,
(c) a lip plate depending perpendicularly from and integrally attached to said horizontal plate,
(d) a plurality of threaded holes in said lip plate to receive set bolts, and
(e) a plurality of set bolts passing through the threaded holes in said lip plate and being of sufficient length to contact a face of the flange on which the tool will be secured,
said tool also including means mounted on each of the bolts passing through the vertical plate of said support member to hold said vertical plate in a fixed, spaced parallel relationship with said parallel facing plates.

3. A tool of claim 2 in which the means mounted on the bolts to hold the vertical plate of the support member in a fixed, spaced parallel relationship with the parallel facing plates are lock nuts.

4. A method for sealing two complementary flanged fittings to provide a leakproof seal therebetween without requiring a worker to place a hand between the two fittings to be joined which comprises:
(a) adjusting the length of the "O" ring support band of a tool of claim 1 so that the circumference of the loop defined by the lower arcuate face of the "O" ring support plate and the "O" ring support band is substantially equal to the circumference of the "O" ring seating grooves provided in said fittings,
(b) inserting into the loop of (a) an "O" ring whose annulus has a cross-sectional diameter greater than the thickness of the "O" ring support plate and width of said band,
(c) adjusting the position of said tool, if necessary, so that the "O" ring is seated in the seating groove provided in one of said fittings,
(d) attaching said tool onto the flange of said fitting,
(e) moving the second flanged fitting into loose, nontouching engagement with the first flanged fitting, the distance between said flange faces being less than the cross-sectional diameter of the annulus of the "O" ring,
(f) unfastening the ends of the "O" ring support band and withdrawing the "O" ring support band from the tool,
(g) detaching the tool from the first flanged fitting and withdrawing the tool from between the adjoining fittings, and
(h) urging said fittings into tight engagement to compress said "O" ring and provide a leakproof seal between said fittings.

* * * * *